US012633602B2

(12) United States Patent
Jiang et al.

(10) Patent No.: US 12,633,602 B2
(45) Date of Patent: May 19, 2026

(54) BATTERY TOP COVER ASSEMBLY STRUCTURE

(71) Applicant: JIANGSU ZENERGY BATTERY TECHNOLOGIES GROUP CO., LTD., Changshu (CN)

(72) Inventors: Bin Jiang, Dongguan (CN); Yongjun Li, Dongguan (CN); Cheng Wang, Dongguan (CN); Wuyuan Zou, Dongguan (CN)

(73) Assignee: JIANGSU ZENERGY BATTERY TECHNOLOGIES GROUP CO., LTD., Suzhou City (CN)

( * ) Notice: Subject to any disclaimer, the term of this patent is extended or adjusted under 35 U.S.C. 154(b) by 793 days.

(21) Appl. No.: 17/962,524

(22) Filed: Oct. 9, 2022

(65) Prior Publication Data

US 2023/0032938 A1 Feb. 2, 2023

Related U.S. Application Data

(63) Continuation of application No. PCT/CN2021/089566, filed on Apr. 25, 2021.

(30) Foreign Application Priority Data

Apr. 26, 2020 (CN) .......................... 202020653487.4

(51) Int. Cl.
*H01M 50/147* (2021.01)
*H01M 50/553* (2021.01)

(52) U.S. Cl.
CPC ....... *H01M 50/147* (2021.01); *H01M 50/553* (2021.01); *H01M 2220/20* (2013.01)

(58) Field of Classification Search
CPC ............. H01M 50/147; H01M 50/553; H01M 2220/20; H01M 50/176; H01M 50/3425; H01M 50/15; H01M 50/188; H01M 50/55; H01M 50/593; Y02E 60/10
See application file for complete search history.

(56) References Cited

U.S. PATENT DOCUMENTS

2015/0104671 A1     4/2015  Zhang et al.
2022/0359937 A1*   11/2022  Cao ..................... H01M 50/566

FOREIGN PATENT DOCUMENTS

CN          105576161 A      5/2016
CN          207052638 U      2/2018
CN          108365138 A      8/2018
            (Continued)

OTHER PUBLICATIONS

The EESR of counterpart EP application No. 21797313.0 was issued on Jun. 27, 2024.

*Primary Examiner* — Ula C Ruddock
*Assistant Examiner* — Sarika Gupta
(74) *Attorney, Agent, or Firm* — Scully, Scott, Murphy & Presser, P.C.

(57) ABSTRACT

A battery top cover assembly structure includes a top cover sheet and an electrode column arranged thereon. The top cover sheet is provided with a mounting hole for mounting the electrode column. An insulating part and a plastic part are sleevedly arranged on the electrode column in sequence. The plastic part is embedded in a bottom of the mounting hole. A bottom of the electrode column is fixedly provided on a bottom surface of the plastic part.

8 Claims, 9 Drawing Sheets

(56)         References Cited

FOREIGN PATENT DOCUMENTS

| CN | 109301105 A | 2/2019 |
| CN | 110379953 A | 10/2019 |
| CN | 110854308 A | 2/2020 |
| CN | 110957438 A | 4/2020 |
| CN | 212062562 U | 12/2020 |
| CN | 212366065 U | 1/2021 |

* cited by examiner

BATTERY TOP COVER ASSEMBLY STRUCTURE

CROSS-REFERENCE TO RELATED APPLICATION

This application is a continuation of International Patent Application No. PCT/CN2021/089566, filed on Apr. 25, 2021, which claims the benefit of priority from Chinese Patent Application No. 202020653487.4, filed on Apr. 26, 2020. The content of the aforementioned application, including any intervening amendments thereto, is incorporated herein by reference in its entirety.

TECHNICAL FIELD

The application relates to battery production and manufacturing, and more particularly to a battery top cover assembly structure.

BACKGROUND

In view of the increasingly prominent environmental problems, low-carbon economy has become the mainstream of future economic development. The increasingly severe air pollution has further promoted the popularization of new energy vehicles, where hybrid electric vehicles (HEVs) and pure electric vehicles (PEVs) have gradually been recognized by manufacturers and consumers. Power batteries have played a key role in supplying power to the electric vehicles. The top cover electrode column structure has been widely used in the power batteries. Usually, the top cover plate is designed with a first electrode column through hole and a second electrode column through hole for the installation of electrode columns. The electrode columns and a sealing sleeve are fastened on the top cover plate with an injection molded part to realize electrical connection.

Unfortunately, the above design generally struggles with complicated assembly operation, and secondary crystallization and stress will be generated, which result in deformation of the injection molded part and cause the leakage, weakening the safety of the battery core and even causing the complete failure.

SUMMARY

In view of the deficiencies in the prior art, this application provides a battery top cover assembly structure, which has reduced assembly parts and simplified production process, and can improve the utilization rate of the space inside the battery, thereby increasing the energy density of the battery core.

Technical solutions of this application are described as follows.

In a first aspect, this application provides a battery top cover assembly structure, including:

a top cover sheet; and an electrode column arranged on the top cover sheet;

wherein the top cover sheet is provided with a mounting hole for mounting the electrode column; an insulating part and a plastic part are sleevedly arranged on the electrode column in sequence; the plastic part is embedded in a bottom of the mounting hole; and a bottom of the electrode column is fixedly provided on a top surface of the plastic part.

In an embodiment, a first groove is provided on a top of the mounting hole, and a second groove is provided on the bottom of the mounting hole; a bottom surface of the insulating part is in concavo-convex fit with the first groove; and a top surface of the plastic part is in concavo-convex fit with the second groove.

In an embodiment, the insulating part includes a first insulating part and a second insulating part; a bottom surface of the first insulating part and a bottom surface of the second insulating part are respectively provided with a first recess; the first groove is provided with a first protrusion matched with the first recess; and the plastic part includes a first plastic part and a second plastic part; a top surface of the first plastic part and a top surface of the second plastic part are respectively provided with a second recess; and the second groove is provided with a second protrusion matched with the second recess.

In an embodiment, the first plastic part is made of a conductive plastic; the second plastic part is provided with two through holes for the electrode column to pass through; and one of the two through holes is arranged around the bottom of the electrode column, and a top of the other of the two through holes is embedded in the second groove.

In an embodiment, the electrode column includes an electrode column main body, a boss, and a welding part connected in sequence; the welding part includes a ring body and a protruding portion provided on the ring body; a welding hole is provided at a top of the protruding portion; and the boss is welded to the welding hole.

In an embodiment, the insulating part is provided with a through hole for the electrode column to pass through; a groove for accommodating the electrode column main body is provided on a top of the through hole; and a curvature of an inner wall of the through hole is matched with a curvature of a top of the welding part.

In an embodiment, the plastic part extends along a side wall of the protruding portion and abuts against a bottom of the insulating part.

In an embodiment, the bottom surface of the plastic part is provided with a limiting groove; the ring body is provided with a first reinforcing rib matched with the limiting groove, and/or at least one second reinforcing rib is provided at a connection between the ring body and the protruding portion; and the first reinforcing rib is provided with a plurality of notches.

In an embodiment, the electrode column includes a first electrode column and a second electrode column; an electrode column main body and a boss of the first electrode column are integrally formed; an electrode column main body and a boss of the second electrode column are respectively formed; the electrode column main body of the first electrode column and the electrode column main body of the second electrode column are both made of an aluminum material; and the boss and a welding part of the second electrode column are both made of a copper material.

In an embodiment, the top cover sheet is further provided with at least one of an explosion-proof valve air hole and a liquid injection hole; a space for accommodating an explosion-proof valve is provided between the top cover sheet and the second plastic part; and a protective film is provided on a top of the explosion-proof valve air hole.

Compared to the prior art, this application has the following beneficial effects.

The battery top cover assembly structure provided herein includes a top cover sheet and an electrode column arranged thereon. The top cover sheet is provided with a mounting hole for mounting the electrode column. An insulating part and a plastic part are sleevedly arranged on the electrode column in sequence, and the plastic part is embedded in a bottom of the mounting hole, and a bottom of the electrode column is fixedly provided on a bottom surface of the plastic part. The existing top cover sheet is designed with a first electrode column through hole and a second electrode column through hole, and the electrode columns and the sealing sleeve are fastened to the top cover sheet by means of the injection molded part to realize the electrical connection, which results in complicated assembly operation. Moreover, the injection molded part is prone to deformation due to the generation of secondary crystallization and stress, which will result in air leakage, thereby reducing the safety performance of the battery core or causing the complete failure. In the application, the electrode column has detachable split structure which is convenient to sleeve the insulating part on the electrode column, so that the electrode column is fastened to the top cover sheet, which not only has the insulating effect between the top cover sheet and the electrode column, but also can ensure the sealing between the top cover sheet and the electrode column. At the same time, the insulating part is a separate part, due to the absence of the injection molded part, the material deformation is reduced, and the production process is simplified. The top of the electrode column passes through the insulating part and is fixed to the top cover sheet, which can improve the stability between the electrode column and the top cover sheet and improve the safety of the battery. At the same time, the bottom of the electrode column is fixed on the bottom surface of the top cover sheet by the plastic part, and the plastic part has the function of electrically connecting or insulating the electrode column and the bottom surface of the top cover sheet. Among them, the insulating part is embedded in the top of the mounting hole, and the plastic part is embedded in the bottom of the mounting hole, which help to reduce the overall height of the top cover and improve the utilization rate of the internal space of the battery, thereby improving the energy density of the battery core. In addition, the bottom of the electrode column is fixed on the bottom surface of the plastic part. That is, the bottom of the electrode column is clamped on the bottom surface of the top cover sheet, which helps to improve the assembly stability between the electrode column and the top cover sheet. On the premise of ensuring the stability of the top cover, the battery top cover assembly structure can reduce assembly parts, which is beneficial to simplify the production process and can also improve the utilization rate of the space inside the battery, thereby improving the energy density of the battery core.

In the figures: 1—first electrode column; 2—second electrode column; 3—top cover sheet; 5—first plastic part; 6—second plastic part; 31—mounting hole; 32—explosion-proof valve air hole; 33—liquid injection hole; 311—first groove; 312—second groove; 3111—first protrusion; 3121—second protrusion; 41—first insulating part; 42—second insulating part; 43—second through hole; 431—third groove; 40—first recess; 56—second recess; 57—limiting groove; 61—first through hole; 7—electrode column main body; 8—boss; 9—welding part; 91—ring body; 92—protruding portion; 911—first reinforcing rib; 921—welding hole; 922—second reinforcing rib; 9111—notch; 10—explosion-proof valve; and 20—protective film.

DETAILED DESCRIPTION OF EMBODIMENTS

It should be understood by those skilled in the art that hardware manufacturers may refer to the same component by different names. Components are distinguished by the function difference instead of the name difference. As used herein, "comprising" is an open-ended term, and thus should be interpreted as "including but not limited to". "Approximately" means that within an acceptable error range, those skilled in the art can solve technical problems, and basically achieve technical effects.

As used herein, it should be understood that the orientation or positional relationship indicated by the terms "upper", "lower", "front", "rear", "left", "right" and "horizontal" is based on the orientation or positional relationship shown in the accompanying drawings, which is only for the convenience of describing the technical solutions and simplifying the description, rather than indicating or implying that the indicated device or element must have a specific orientation, be constructed or operated in a specific orientation. Therefore, these terms should not be understood as a limitation of the present disclosure.

As used herein, unless otherwise expressly specified and defined, terms, such as "mount", "connect", and "fix", should be understood in a broad sense, for example, it may be fixed connection, detachable connection, or integral connection; it may be mechanical direction or electrical connection; it may be direct connection or indirect connection through an intermediate medium; and it may be an internal communication between two members. For those skilled in the art, the specific meanings of the above terms can be understood according to specific situations.

Figure 1:
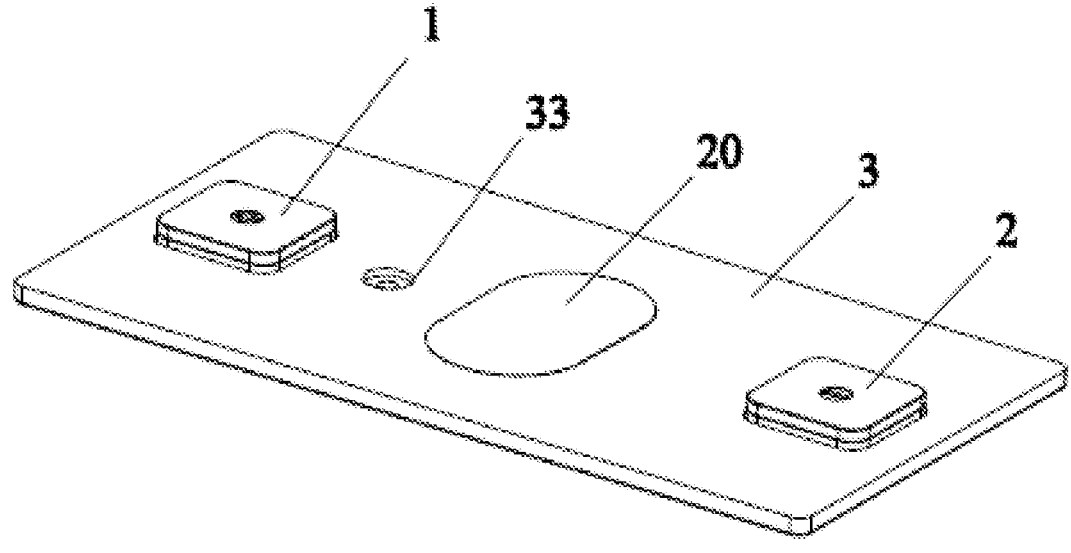
FIG. 1 schematically shows a structure of a battery top cover assembly structure according to an embodiment of the present disclosure.
Figure 2:
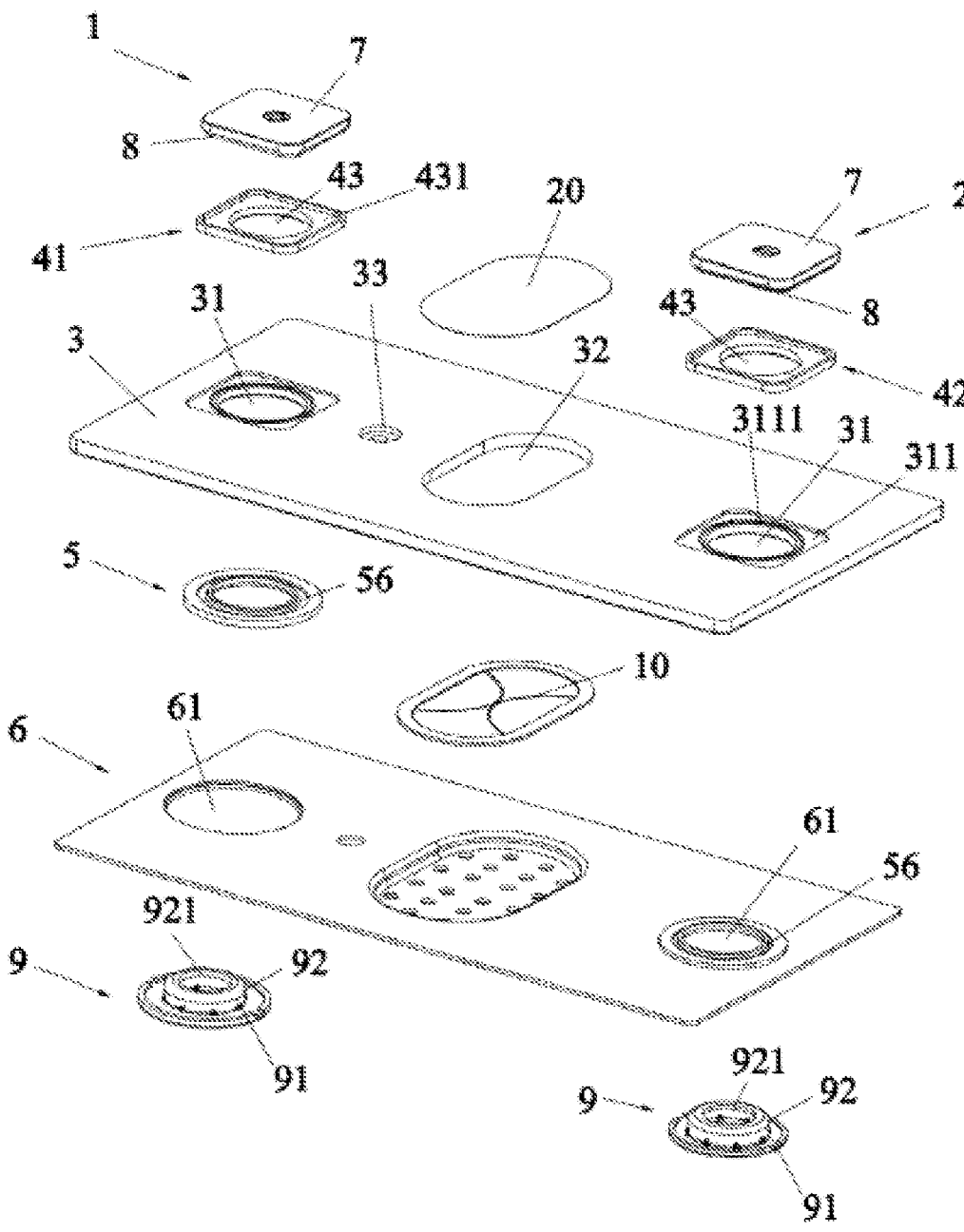
FIG. 2 is an exploded view of the battery top cover assembly structure according to an embodiment of the present disclosure.
Figure 3:
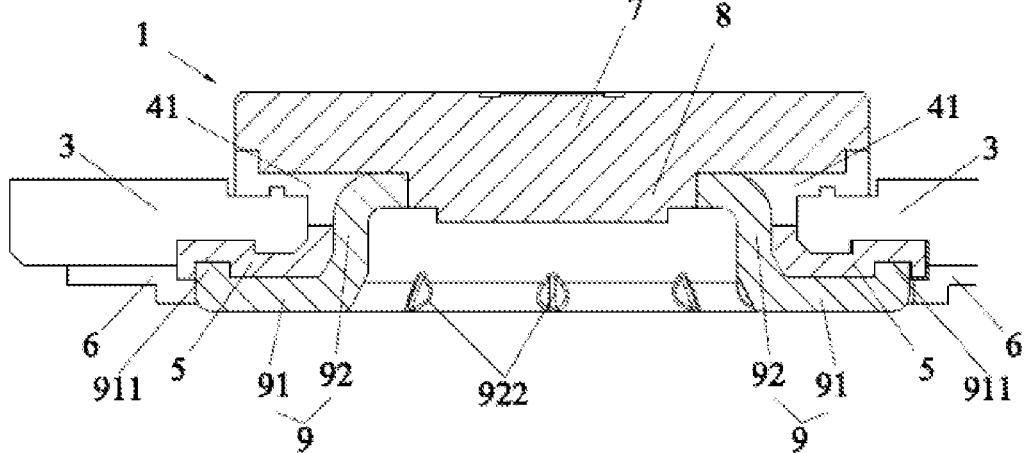
FIG. 3 is a sectional view showing a first electrode column after a top cover sheet is mounted.
Figure 4:
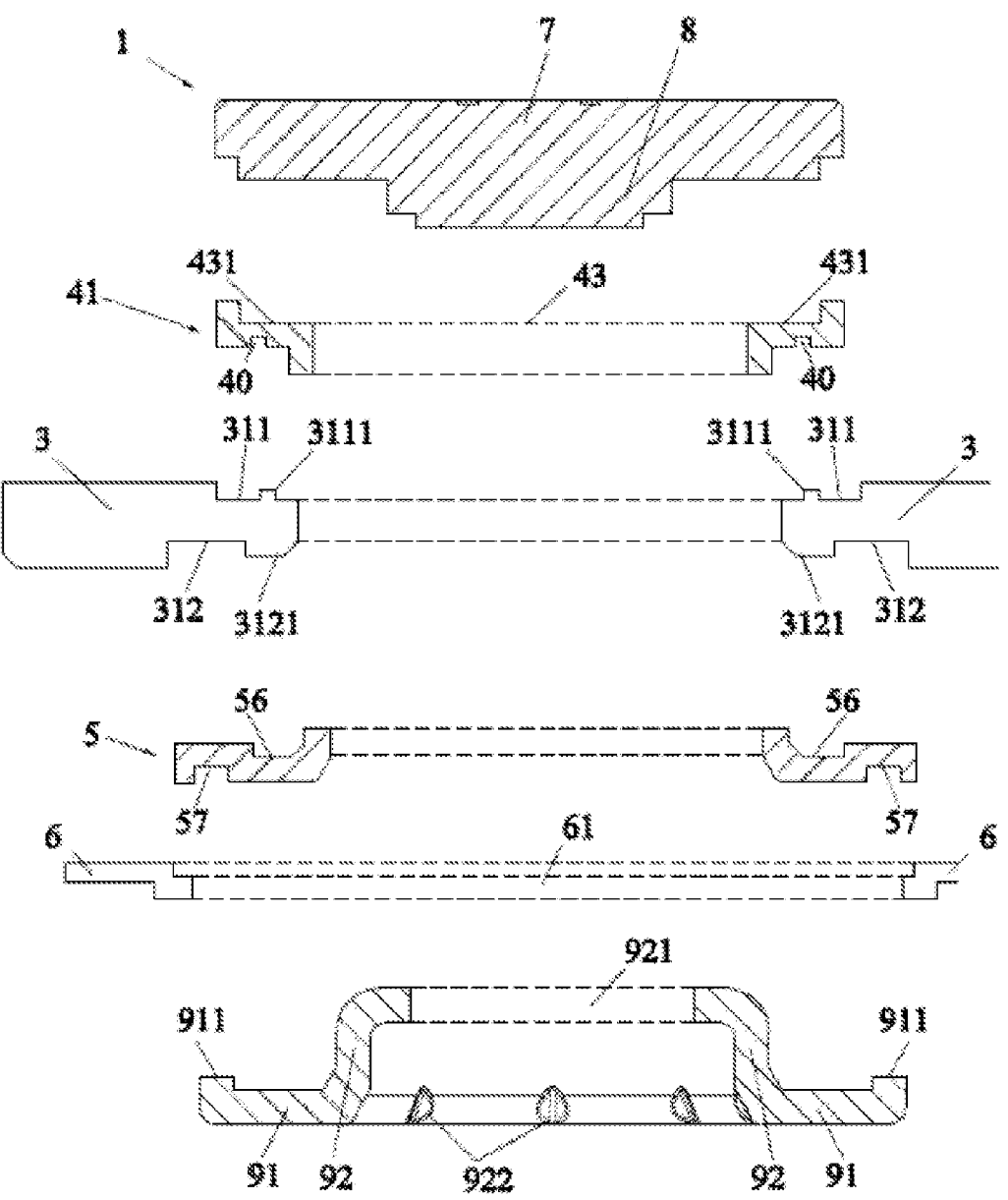
FIG. 4 is an exploded sectional view showing the first electrode column after the top cover sheet is mounted.
Figure 5:
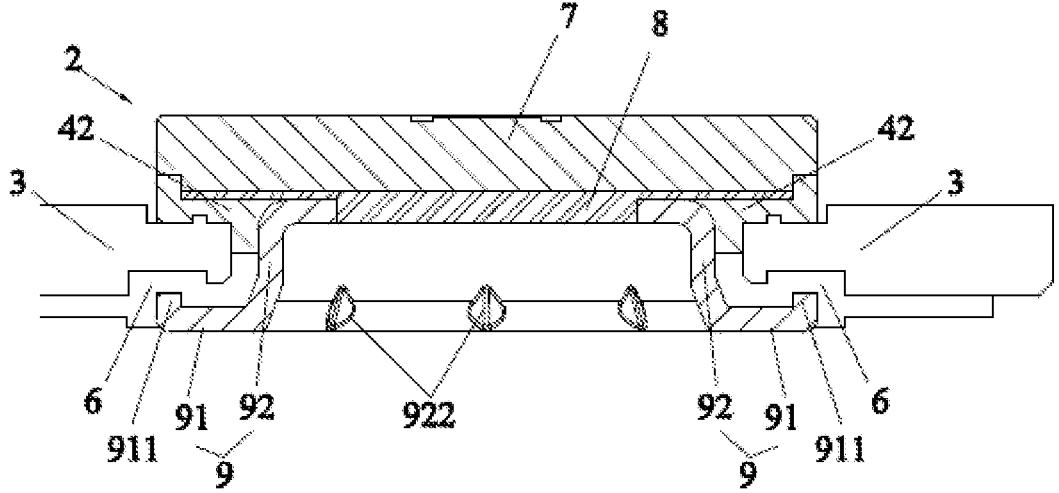
FIG. 5 is a sectional view showing a second electrode column after the top cover sheet is mounted.
Figure 6:
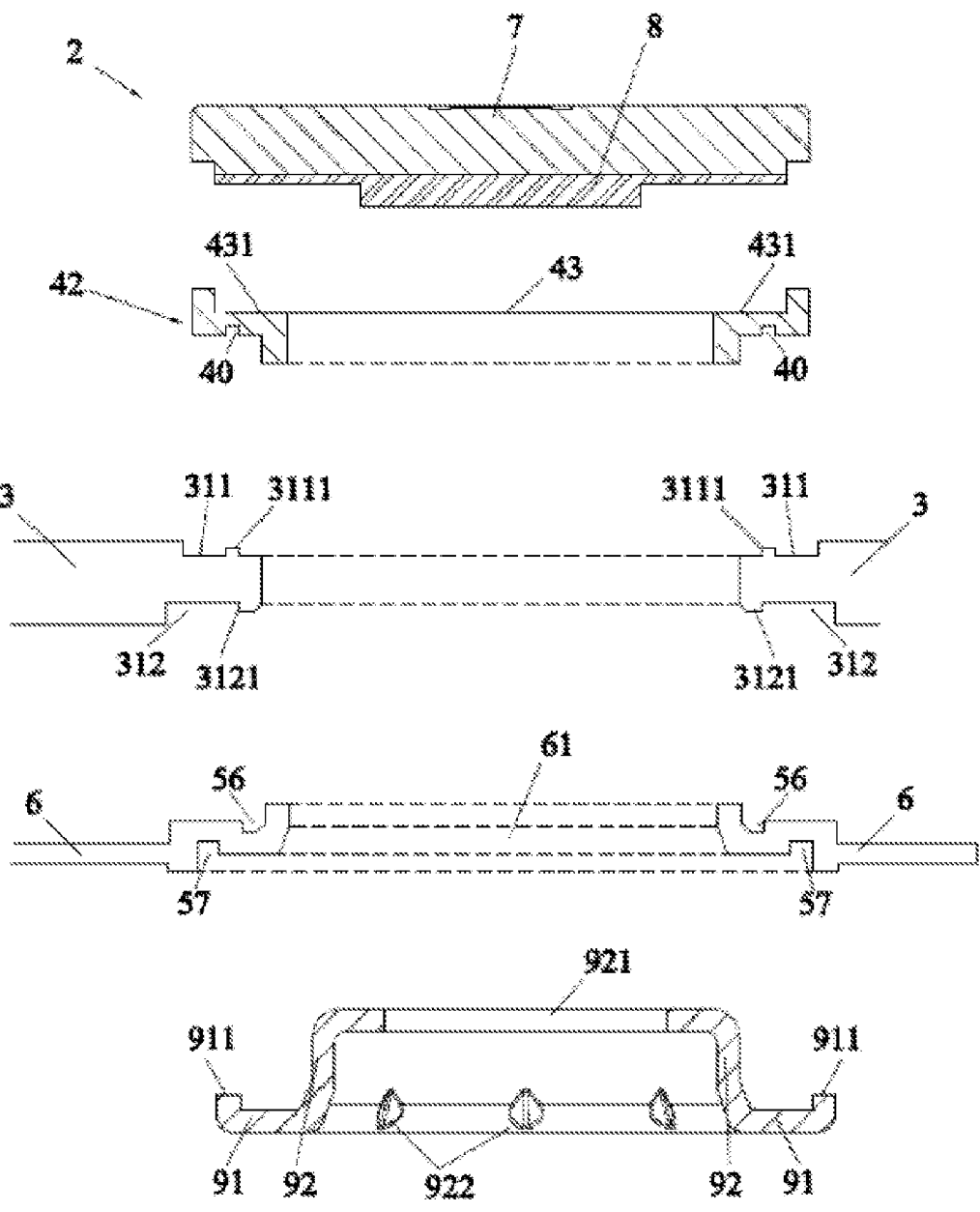
FIG. 6 is an exploded sectional view showing the second electrode column after the top cover sheet is mounted.
Figure 7:
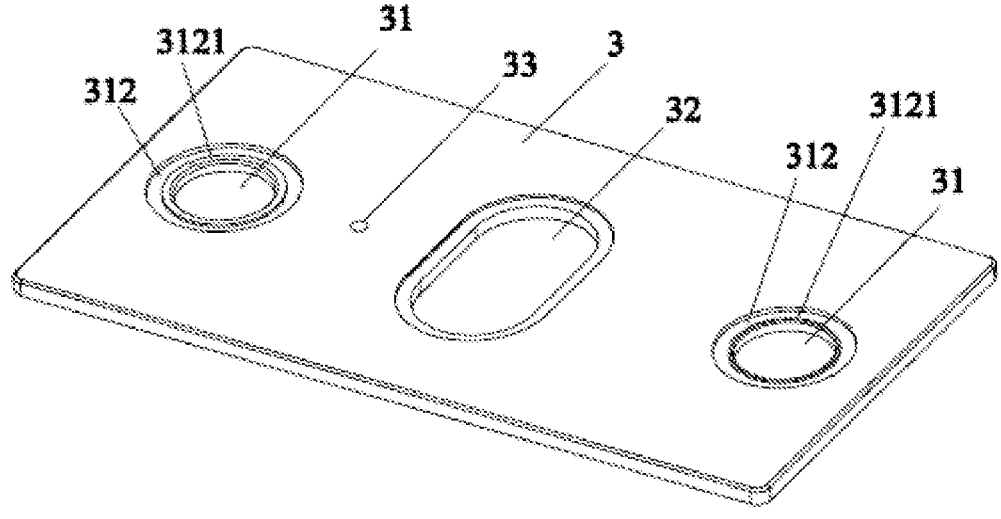
FIG. 7 is a structural diagram showing a bottom surface of the top cover sheet according to an embodiment of the present disclosure.
Figure 8:
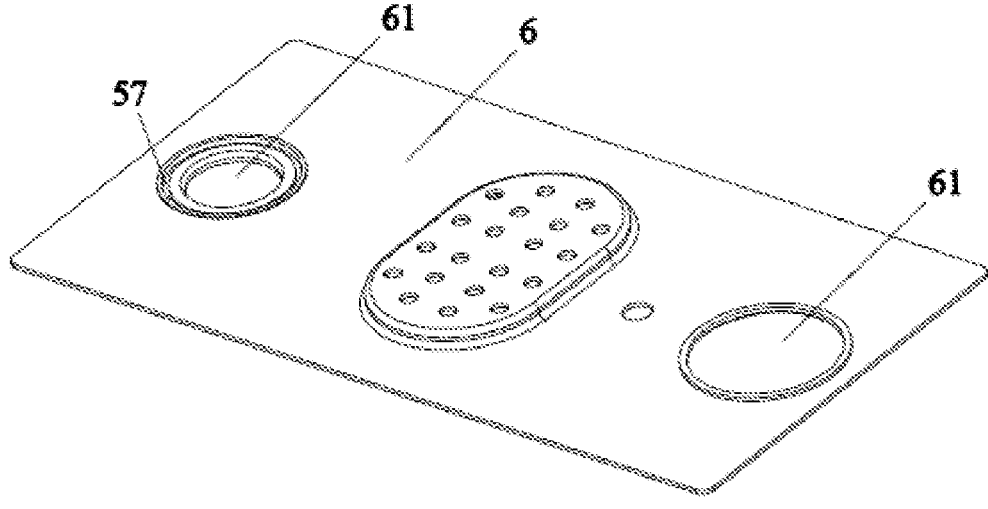
FIG. 8 is a structural diagram showing a bottom surface of a plastic part according to an embodiment of the present disclosure.
Figure 9:
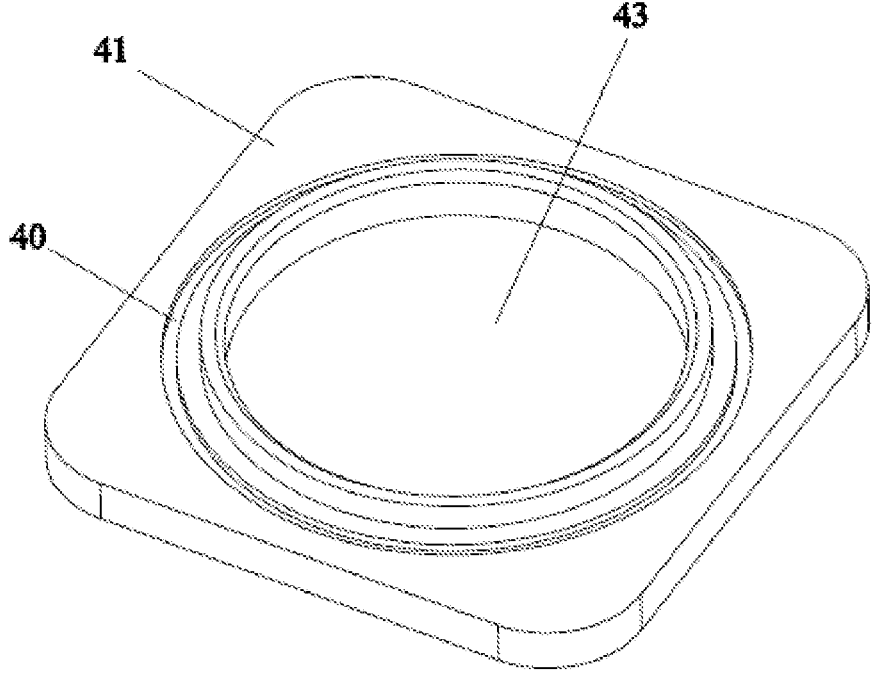
FIG. 9 is a structural diagram of an insulating part according to an embodiment of the present disclosure.
Figure 10:
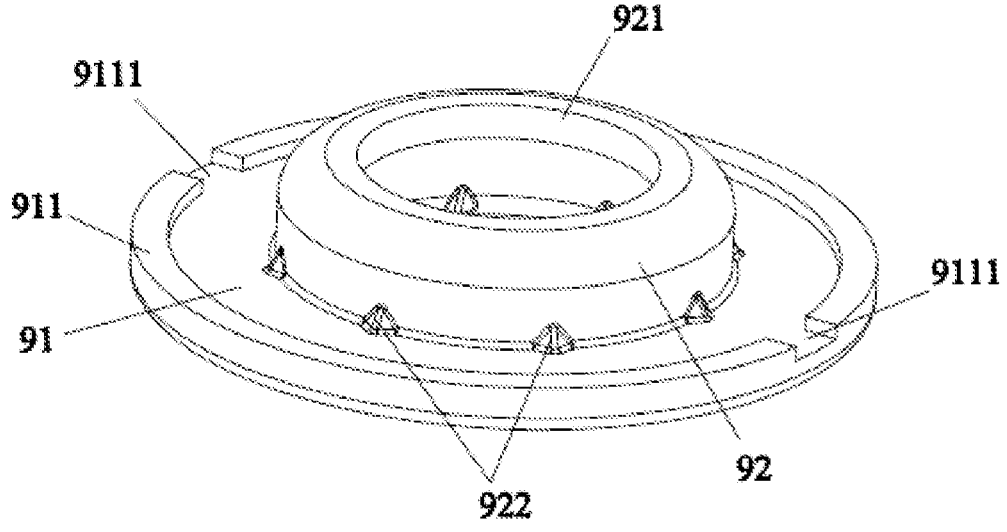
FIG. 10 is a structural diagram of a welding part according to an embodiment of the present disclosure.
Figure 11:
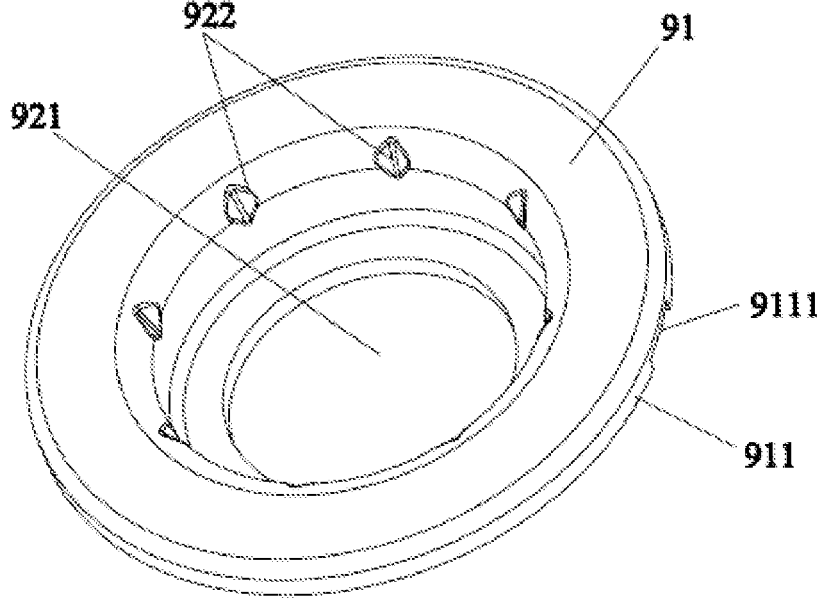
FIG. 11 is a structural diagram showing a bottom surface of the welding part according to an embodiment of the present disclosure.

The disclosure will be further described in detail in conjunction with the FIGS. 1-11, and these drawings are not intended to limit the disclosure.

Embodiment 1

Provided herein is a battery top cover assembly structure, which includes a top cover sheet 3 and an electrode column arranged thereon. The top cover sheet 3 is provided with a mounting hole 31 for mounting the electrode column. An insulating part and a plastic part are sleevedly arranged on the electrode column in sequence, the plastic part is embedded in a bottom of the mounting hole 31, and a bottom of the electrode column is fixed on a bottom surface of the plastic part. The existing top cover sheet is designed with a first electrode column through hole and a second electrode column through hole, and the electrode columns and the sealing sleeve are fastened to the top cover sheet by means of the injection molded part to realize the electrical connection, which results in complicated assembly operation. Moreover, the injection molded part is prone to deformation due to the generation of secondary crystallization and stress, which will result in air leakage, thereby reducing the safety performance of the battery core or causing the complete failure. In this application, the electrode column has a detachable split structure which helps to sleeve the insulating part on the electrode column, so that the electrode column is fastened to the top cover sheet 3, which not only has the insulating effect between the top cover sheet 3 and the electrode column, but also can ensure the sealing property between the top cover sheet 3 and the electrode column. At the same time, the insulating part is a separate part, due to the absence of the injection molded part, the material deformation is reduced, and the production process is simplified. The top of the electrode column passes through the insulating part and is fixed to the top cover sheet 3, which can improve the assembly stability between the electrode column and the top cover sheet 3 and the safety of the battery. At the same time, the bottom of the electrode column is fixed on the bottom surface of the top cover sheet 3 by the plastic part, and the plastic part has the function of electrically connecting or insulating the electrode column and the bottom surface of the top cover sheet 3. Among them, the insulating part is embedded in the top of the mounting hole 31, and the plastic part is embedded in the bottom of the mounting hole 31, which reduce the overall height of the top cover and improve the utilization rate of the space inside the battery, thereby improving the energy density of the battery core. In addition, the bottom of the electrode column is fixed on the bottom surface of the plastic part. That is, the bottom of the electrode column is clamped on the bottom surface of the top cover sheet 3, which improves the assembly stability of the electrode column and the top cover sheet 3. On the premise of ensuring the stability of the top cover, parts to be assembled on the top cover of the battery is reduced. The plastic part is prepared from fluoroplastic by injection molding or from fluororubber by die-cutting forming, which has good electrical insulation properties, high heat resistance, oil resistance, solvent resistance, abrasion resistance, moisture resistance and low-temperature resistance, facilitating prolonging prolong the service life of the plastic part.

In this embodiment, a first groove 311 is provided on a top of the mounting hole 31, and a second groove 312 is provided on the bottom of the mounting hole 31. The bottom surface of the insulating part is in concavo-convex fit with the first groove 311, and the top surface of the plastic part is in concavo-convex fit with the second groove 312. The insulating part includes a first insulating part 41 and a second insulating part 42. The bottom surface of the first insulating part 41 and the bottom surface of the second insulating part 42 are in concave-convex fit with the corresponding first groove 311. Such an arrangement helps to embed the first insulating part 41 and the second insulating part 42 into the mounting hole 31 on the top cover sheet 3, which not only improves the assembly stability between the first insulating part 41, the second insulating part 42 and the top cover sheet 3, and prevents the top cover from the leakage, but also reduces the overall height of the battery top cover. The plastic part includes a first plastic part 5 and a second plastic part 6. A top surface of the first plastic part 5 and a top surface of the second plastic part 6 are respectively in concave-convex fit with the corresponding second groove 312. Such an arrangement is convenient to insert the first plastic part 5 and the second plastic part 6 into the mounting hole 31 of the top cover sheet 3, which not only improves the assembly stability between the first plastic part 5, the second plastic part 6 and the top cover sheet 3, and prevents the top cover from the leakage, but also reduces the space occupied by the first plastic part 5 and the second plastic part 6 inside the battery, and improves the utilization rate of the space inside the battery, thereby improving the energy density of the battery core.

In this embodiment, a first recess 40 is respectively provided on a bottom surface of the first insulating part 41 and a bottom surface of the second insulating part 42. The first groove 311 is provided with a first protrusion 3111 matched with the first recess 40. The top surface of the first plastic part 5 and the top surface of the second plastic part 6 are respectively provided with a second recess 56, and the second groove 312 is provided with a second protrusion 3121 matched with the second recess 56. The concave-convex fit between the first recess 40 and the first protrusion 3111 not only realizes that the first insulating part 41 and the first plastic part 5 are inserted into the first groove 311 and the second groove 312 respectively, thereby limiting the positions of the first insulating part 41 and the first plastic part 5, but also prevents the first insulating part 41 and the first plastic part 5 from displacing after being assembled. The concave-convex fit between the first recess 40 and the first protrusion 3111 improves the overall stability of the top cover. The concave-convex fit between the second recess 56 and the second protrusion 3121 not only limits the second insulating part 42 and the second plastic part 6, but also prevents the second insulating part 42 and the second plastic part 6 from moving after being mounted, which improves the overall stability of the top cover. However, it is not limited thereto. The protrusion or recess in the first groove 311 and the second groove 312 can be adjusted according to the actual structures of the first insulating part 41, the second insulating part 42, the first plastic part 5 and the second plastic part 6. For example, a slot is also provided in the first groove 311 which also matches with the first insulating part 41 and the first plastic part 5. In addition, the number of the first protrusion 3111 in the first groove 311 or the second protrusion 3121 on the second groove 312 can be adjusted according to actual mechanical strength requirements.

In this embodiment, the electrode column includes a first electrode column 1 and a second electrode column 2. The first plastic part 5 is made of a conductive plastic, and the second plastic part 6 is provided with two first through holes 61 for the electrode columns (1, 2) to pass through. One of the two first through holes 61 is arranged around the bottom of the first electrode column 1, and a top of the other of the two first through holes 61 is embedded in the second groove 312. The first plastic part 5 is obtained by mixing PPS material, PSU material, PA material or nanomaterial with conductive substances such as carbon black and metal powder and so on. Conductive substances provide carriers in the first plastic part 5. When high temperature and high pressure inside the battery, the first plastic part 5 can be normally turned over by a flip sheet to realize the connection between the positive electrode column and the negative electrode column. Therefore, an internal protection circuit is provided to prevent the battery from exploding. The resistance value of the first plastic part 5 is 10 Ω~30000Ω. The first plastic part 5 has been embedded under the mounting hole 31 of the first electrode column 1 during assembly, so the first plastic part 5 connects the welding part 9 to the bottom surface of the top cover sheet 3, so that the first electrode column 1 and the top cover sheet 3 are electrically connected. Therefore, the first through hole 61 corresponding to the first electrode column 1 are disposed around the bottom of the first electrode column 1 to prevent the electrolyte from corroding the first plastic part 5. Since the second electrode column 2 needs to be insulated from the top cover sheet 3, the second insulating part 42 and the second plastic part 6 are used to insulate the side of the second electrode column 2. An edge of the first through hole 61 protrudes upwardly and matches with the second groove 312, so that the first through hole 61 corresponding to the second electrode column 2 is embedded in the second groove 312, thereby eliminating other insulating parts mounted on the second plastic part 6. Such an arrangement reduces the parts of the top cover and the production cost of the top cover.

In this embodiment, the electrode column (1, 2) includes an electrode column main body 7, a boss 8 and a welding part 9 connected in sequence. The welding part 9 includes a ring body 91 and a protruding portion 92 disposed on the ring body 91, a welding hole 921 is provided at a top of the protruding portion 92, and the boss 8 is welded in the welding hole 921. An inner side of the ring body 91 protrudes upward to form a protruding portion 92 which facilitates to form a space inside the protruding portion 92 for accommodating the tabs of the battery core, which reduces the excessive occupation of the space inside the battery by the tabs of the battery core and improves the space utilization rate inside the battery, thereby improving the energy density of the battery. A bottom of the welding part 9 is fixed to the bottom surface of the top cover sheet 3 by the first plastic part 5 or the second plastic part 6. A first reinforcing rib 911 at the bottom of the welding part 9 is fixed to the bottom surface of the top cover sheet 3 and fastened to the top cover sheet 3 in cooperation with the insulating part, so the bottoms of the first electrode column 1 and the second electrode column 2 are clamped in the bottom surface of the top cover sheet 3, which improves the assembly stability between the electrode columns (1, 2) and the top cover sheet 3. The boss 8 matches with the welding hole 921, which is convenient for embedding the welding part 9 into the mounting hole 31, which not only reduces the overall thickness of the top cover and the space occupation inside the battery, thereby improving the energy density of the battery, but also facilitate welding the electrode columns (1, 2) and the welding part 9. Welding process is performed along the gap between the boss 8 and the welding hole 921, which reduces the welding cost of the electrode columns (1, 2), simplifies the welding process, and improves the assembly efficiency. The top of the protruding portion 92 is provided with a welding hole 921 for embedding the boss 8. The protruding portion 92 forms a space for accommodating the tabs of the battery cores, which can reduce the excessive occupation of the space inside the battery by the tabs of the battery core and improve the space utilization rate inside the battery, thereby improving the energy density of the battery. Specifically, the protruding portion 92 is fixed to the boss 8 by seam-welding, resistance welding or penetration welding.

In this embodiment, the bottom surface of the plastic part (5, 6) is provided with a limiting groove 57, and the ring body 91 is provided with the first reinforcing rib 911 matched with the limiting groove 57. And/or at least one second reinforcing rib 922 is provided at a connection between the ring body 91 and the protruding portion 92, and the first reinforcing rib 911 is provided with a plurality of notches 9111. The first reinforcing rib 911 is added to the ring body 91 of the first electrode column 1, so that the bottom of the welding part 9 of the first electrode column 1 abuts against the bottom surface of the first plastic part 5, so that the welding part 9 is fixed on the bottom surface of the top cover sheet 3, thereby preventing the welding part 9 from being folded when the first electrode column 1 is subjected to external force and reducing the leakage in the first electrode column 1. At the same time, the first reinforcing rib 911 makes the bottom of the welding part 9 of the second electrode column 2 abut against the bottom surface of the second plastic part 6, so that the welding part 9 of the second electrode column 2 is fixed on the bottom surface of the top cover sheet 3, thereby preventing the welding part 9 from being folded when the second electrode column 2 is subjected to external force and reducing the leakage in the second electrode column 2. The notches 9111 can be in concavo-convex fit with the bottom of the first plastic part 5 or the second plastic part 6, thereby embedding in the first plastic part 5 or the second plastic part 6, which prevents the electrode columns (1, 2) from rotating and reducing the displacement of the welding parts 9.

In this embodiment, an electrode column main body 7 and a boss 8 of the first electrode column 1 are integrally formed, and an electrode column main body 7 and a boss 8 of the second electrode column 2 are respectively formed. Both the electrode column main body 7 of the first electrode column 1 and the electrode column main body 7 of the second electrode column 2 are made of an aluminum material, and the boss 8 and the welding part 9 of the second electrode column 2 are both made of a copper material. The electrode column main body 7 and the boss 8 of the first electrode column 1 have an integral molding structure, which can ensure the quality of the battery, reduce the production cost of the positive electrode column, and improve the mechanical strength of the whole electrode column. The electrode column main body 7 and the boss 8 of the second electrode column 2 are respectively formed, which can ensure that the quality of the battery is not affected and the production cost of the second electrode column 2 is reduced. The boss 8 is provided with an outer edge, which increases the connection area between the welding part 9 and the boss 8, reduces the corrosion at the connection, and improves the firmness of the welding part 9 and the boss 8. Since the price of the aluminum material is lower than that of the copper material, when the negative electrode column current collector is made of copper foil material, the boss 8 and the welding part 9 are made of the copper foil material corresponding to the negative electrode column current collector. The electrode column main bodies 7 of the entire first electrode column 1 and the second electrode column 2 are made of aluminum material, and the boss 8 and the welding part 9 of the second electrode column 2 are made of copper material, which can ensure that the quality of the battery is not affected and the production cost of positive and negative electrode columns is reduced.

In this embodiment, the top cover sheet 3 is further provided with at least one of an explosion-proof valve air hole 32 and a liquid injection hole 33. A space for accommodating an explosion-proof valve 10 is provided between the top cover sheet 3 and the second plastic part 6, and a protective film 20 is provided on a top of the explosion-proof valve air hole 32. The bottom surface of the top cover sheet 3 is recessed inwardly corresponding to the position of the explosion-proof valve air hole 32, and the top surface of the second plastic part 6 is recessed downward, thereby forming a space for accommodating the explosion-proof valve 10 therebetween. The second plastic part 6 is provided with several air holes corresponding to the position of the explosion-proof valve 10. The liquid injection hole 33 is used to inject the electrolyte into the battery, and the second plastic part 6 is provided with a liquid injection through hole at the position corresponding to the liquid injection hole 33 to realize the liquid injection function. The explosion-proof valve 10 can automatically and quickly release the pressure of the battery when the internal pressure of the battery rises due to overcharge, overdischarge, overcurrent and internal short circuit of the battery, thereby avoiding safety accidents caused by battery explosion. The protective film 20 can prevent external impurities from entering the explosion-proof valve 10 and affecting the function of the explosion-proof valve 10. Specifically, the protective film 20 is a PET film.

The working principle of the battery top cover assembly structure is described as follows.

The existing top cover sheet is designed with a first electrode column through hole and a second electrode column through hole, and the electrode columns and the sealing sleeve are fastened to the top cover sheet by means of the injection molded part to realize the electrical connection, which results in complicated assembly operation. Moreover, the injection molded part is prone to deformation due to the generation of secondary crystallization and stress, which will result in the leakage, thereby reducing the safety performance of the battery core or causing the complete failure. In the application, both the first electrode column 1 and the second electrode column 2 have a divided structure, which is convenient to sleeve two insulating parts on the two electrode columns, so that the first electrode column 1 and the second electrode column 2 are fastened to the top cover sheet 3, which not only has the insulating effect between the top cover sheet 3 and the two electrode columns, but also can ensure the sealing between the top cover sheet 3 and the two electrode columns. At the same time, both the first insulating part 41 and the second insulating part 42 are separate parts, due to the absence of the injection molded part, the material deformation is reduced, and the production process is simplified. The top of the first electrode column 1 and the top of the second electrode column 2 respectively pass through the first insulating part 41 and the second insulating part 42 and are then fixed to the top cover sheet 3, which can improve the assembly stability between the electrode columns and the top cover sheet 3 and improve the safety of the battery. At the same time, the bottom of the first electrode column 1 and the bottom of the second electrode column 2 are respectively fixed on the bottom surface of the top cover sheet 3 by the first plastic part 5 and the second plastic part 6. The first plastic part 5 is arranged for electrically connecting the first electrode column 1 to the bottom surface of the top cover sheet 3, and the second plastic part 6 can insulate on the first electrode column 1 and the bottom surface of the top cover sheet 3. Among them, the first insulating part 41 and the second insulating part 42 are respectively embedded in the top of the corresponding mounting hole 31, and the first plastic part 5 and the second plastic part 6 are respectively embedded in the bottom of the corresponding mounting hole 31, which helps to reduce the overall height of the top cover and improves the utilization rate of the space inside the battery, thereby improving the energy density of the battery core. In addition, the bottom of the first electrode column 1 and the bottom of the second electrode column 2 are respectively fixed on the bottom surfaces of the first plastic part 5 and the second plastic part 6. That is, the bottom of the first electrode column 1 and the bottom of the second electrode column 2 are clamped on the bottom surface of the top cover sheet 3, thereby improving the assembly stability between the electrode columns (1, 2) and the top cover sheet 3. On the premise of the stability of the top cover, parts to be assembled on the top cover of the battery are reduced.

Embodiment 2

The differences from embodiment 1 are described as follows. In this embodiment, at least one second reinforcing rib 922 is provided at the connection between the ring body 91 and the protruding portion 92. The insulating part (41, 42) is provided with a second through hole 43 for the electrode column to insert into, a third groove 431 for accommodating the electrode column main body 7 is provided along the top of the second through hole 43, and a curvature of an inner wall of the second through hole 43 is matched with that of a top of the welding part 9. The second reinforcing rib 922 is added to the connection between the ring body 91 and the protruding portion 92, and on the premise that the thickness of the wall of the welding part 9 is not increased, the material, the weight and the cost can be saved, and the strength of the connection of the ring body 91 and the protruding portion 92 is increased. This method not only prevents the welding part 9 from being deformed when the first electrode column 1 or the second electrode column 2 are stretched and folded by force, but also prolongs the service life of the welding part 9. It can be understood that the number of the second reinforcing ribs 922 can be increased or the distance between the second reinforcing ribs 922 can be adjusted according to the strength and rigidity requirements of the welding part 9. In order to match a chamfer on the top of the protruding portion 92, the inner wall of the second through hole 43 forms an arc angle to match the protruding portion 92, which helps to reduce the gap between the protruding portion 92 and the second through hole 43, reduce the leakage in the top cover, and improve the sealing between the top cover and the electrode columns. The third groove 431 is disposed for accommodating the electrode column main body 7 in the second through hole 43, which helps to reduce the overall height of the top cover, insulate the edge of the electrode column main body 7, and reduce the probability of short circuit between the electrode column main body 7 and external parts. According to the actual top cover structure and market demand, the ring body 91 can be designed to be square, circular or oval structure, and the thickness of the ring body 91 is 0.1 mm-20 mm.

Other structures are the same as those in Embodiment 1.

Embodiment 3

The differences from embodiment 1 are described as follows. In this embodiment, the ring body 91 is provided with the first reinforcing rib 911, and at least one second reinforcing rib 922 is provided at the connection between the ring body 91 and the protruding portion 92. The plastic part (5, 6) extends along the sidewall of the protruding portion 92 and abuts against the bottom of the insulating part (41, 42). In this embodiment, the number of the notches 9111 on the first reinforcing rib 911 is two, the two notches 9111 are arranged oppositely, and the number of the second reinforcing ribs 922 is eight, but it is not limited to this. Understandably, according to the size and strength requirements of the first electrode column 1 and the second electrode column 2, the number of the first reinforcing rib 911 or the second reinforcement rib 922 can be increased or the distance between the second reinforcing ribs 922 can be adjusted to meet the requirements, thereby meeting the strength of the welding part 9 and prolonging the service life of the welding part 9.

Other structures are the same as those in Embodiment 1.

Embodiment 4

The differences from embodiment 1 are described as follows. In this embodiment, the bottom surface of the first insulating part 41 and the bottom surface of the second insulating part 42 are both provided with a third recess. The corresponding first groove 311 is provided with a third protrusion matched with the corresponding third recess. The top surface of the first plastic part 5 and the top surface of the second plastic part 6 are both provided with a fourth recess, and the corresponding second groove 312 is provided with a fourth protrusion matched with the fourth recess. The third recesses are in concavo-convex fit with the corresponding third protrusions, and the fourth recesses are in concavo-convex fit with the fourth protrusions, which secures the top cover structure.

Other structures are the same as those in Embodiment 1.

Embodiment 5

The differences from embodiment 1 are described as follows. In this embodiment, the bottom surface of the first insulating part 41 and the bottom surface of the second insulating part 42 are both provided with a fifth protrusion. The corresponding first groove 311 is provided with a fifth recess which is matched with the fifth protrusion. The top surface of the first plastic part 5 and the top surface of the second plastic part 6 are both provided with a sixth recess. The corresponding second groove 312 is provided with a sixth protrusion which is matched with the sixth recess. Several fifth protrusions are in concave-convex fit with several fifth recesses, and several sixth recesses are in concave-convex fit with several sixth protrusions, which secures the top cover structure.

Other structures are the same as those in Embodiment 1.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A battery top cover assembly structure, comprising a top cover sheet; and an electrode column arranged on the top cover sheet, wherein: the top cover sheet is provided with a mounting hole for mounting the electrode column; an insulating part and a plastic part are sleeved on the electrode column in sequence; the plastic part is embedded in a bottom of the mounting hole; and a bottom of the electrode column is fixedly provided on a bottom surface of the plastic part, a first groove is provided on a top of the mounting hole, and a second groove is provided on the bottom of the mounting hole; a bottom surface of the insulating part is in concavo-convex fit with the first groove; and a top surface of the plastic part is in concavo-convex fit with the second groove, the insulating part comprises a first insulating part and a second insulating part; a bottom surface of the first insulating part and a bottom surface of the second insulating part are respectively provided with a first recess; the first groove is provided with a first protrusion matched with the first recess; and the plastic part comprises a first plastic part and a second plastic part; a top surface of the first plastic part and a top surface of the second plastic part are respectively provided with a second recess; and the second groove is provided with a second protrusion matched with the second recess.

2. The battery top cover assembly structure of claim 1, wherein the first plastic part is made of a conductive plastic; the second plastic part is provided with two through holes for the electrode column to pass through; and one of the two through holes is arranged around the bottom of the electrode column, and a top of the other of the two through holes is embedded in the second groove.

3. The battery top cover assembly structure of claim 1, wherein the electrode column comprises an electrode column main body, a boss, and a welding part connected in sequence; the welding part comprises a ring body and a protruding portion provided on the ring body; a welding hole is provided at a top of the protruding portion; and the boss is welded to the welding hole.

4. The battery top cover assembly structure of claim 3, wherein the insulating part is provided with a through hole for the electrode column to pass through; a groove for accommodating the electrode column main body is provided on a top of the through hole; and a curvature of an inner wall of the through hole is matched with a curvature of a top of the welding part.

5. The battery top cover assembly structure of claim 3, wherein the plastic part extends along a side wall of the protruding portion and abuts against a bottom of the insulating part.

6. The battery top cover assembly structure of claim 3, wherein the bottom surface of the plastic part is provided with a limiting groove; the ring body is provided with a first reinforcing rib matched with the limiting groove, and/or at least one second reinforcing rib is provided at a connection between the ring body and the protruding portion; and the first reinforcing rib is provided with a plurality of notches.

7. The battery top cover assembly structure of claim 3, wherein the electrode column comprises a first electrode column and a second electrode column; a electrode column main body and a boss of the first electrode column are integrally formed; an electrode column main body and a boss of the second electrode column are respectively formed; the electrode column main body of the first electrode column and the electrode column main body of the second electrode column are both made of an aluminum material; and the boss and a welding part of the second electrode column are both made of a copper material.

8. The battery top cover assembly structure of claim 1, wherein the top cover sheet is further provided with at least one of an explosion-proof valve air hole and a liquid injection hole; a space for accommodating an explosion-proof valve is provided between the top cover sheet and the second plastic part; and a protective film is provided on a top of the explosion-proof valve air hole.

\* \* \* \* \*